United States Patent [10] Patent No.: US 9,544,802 B2
Gupta et al. (45) Date of Patent: Jan. 10, 2017

(54) SYSTEM AND METHODS FOR DETERMINING OPT IN/OPT OUT STATUS OF MIDDLEWARE RECEPTION REPORTING FOR EMBMS SERVICES

(71) Applicant: QUALCOMM Incorporated, San Diego, CA (US)

(72) Inventors: Chaitali Gupta, San Diego, CA (US); Ralph A. Gholmieh, San Diego, CA (US); Nagaraju Naik, San Diego, CA (US); Carlos M. D. Pazos, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 743 days.

(21) Appl. No.: 13/802,618

(22) Filed: Mar. 13, 2013

(65) Prior Publication Data

US 2014/0269335 A1 Sep. 18, 2014

(51) Int. Cl.
*H04L 12/26* (2006.01)
*H04W 24/10* (2009.01)
(52) U.S. Cl.
CPC .................................. *H04W 24/10* (2013.01)
(58) Field of Classification Search
CPC ............................. H04W 24/10; H04W 24/08
USPC ......................................................... 370/241
See application file for complete search history.

(56) References Cited

U.S. PATENT DOCUMENTS

| 8,554,175 | B2* | 10/2013 | Pecen | H04L 63/0823 |
| | | | | 455/410 |
| 2008/0051076 | A1* | 2/2008 | O'Shaughnessy | G06F 21/305 |
| | | | | 455/419 |
| 2009/0245155 | A1 | 10/2009 | Fukunaga et al. | |
| 2011/0103247 | A1 | 5/2011 | Chen et al. | |
| 2011/0199921 | A1 | 8/2011 | Damnjanovic et al. | |
| 2012/0069748 | A1* | 3/2012 | Van Den Bogaert | H04W 24/10 |
| | | | | 370/252 |
| 2012/0275369 | A1 | 11/2012 | Zhang et al. | |
| 2013/0010624 | A1* | 1/2013 | He | H04L 41/5009 |
| | | | | 370/252 |
| 2014/0023147 | A1* | 1/2014 | Jiang | H04N 19/39 |
| | | | | 375/340.27 |
| 2014/0140260 | A1* | 5/2014 | Wang | H04W 4/06 |
| | | | | 370/312 |
| 2014/0241229 | A1* | 8/2014 | Bertorelle | H04W 4/06 |
| | | | | 370/312 |
| 2014/0376441 | A1* | 12/2014 | Lohmar | H04W 4/06 |
| | | | | 370/312 |

FOREIGN PATENT DOCUMENTS

EP 2528270 A1 11/2012

\* cited by examiner

*Primary Examiner* — Faisal Choudhury
(74) *Attorney, Agent, or Firm* — The Marbury Law Group, PLLC

(57) ABSTRACT

A system and methods for determining whether to participate in reception reporting procedures for an eMBMS service. Multiple applications on a receiver device can consume the same file download or streaming eMBMS service, and can have conflicting opt in/opt out settings for reporting in middleware. Algorithms are provided that take into account the different opt statuses of applications, and allow middleware components to determine whether to log reception metrics for a service and/or whether a reception report should be uploaded after a service session of the service.

64 Claims, 14 Drawing Sheets

SYSTEM AND METHODS FOR DETERMINING OPT IN/OPT OUT STATUS OF MIDDLEWARE RECEPTION REPORTING FOR EMBMS SERVICES

BACKGROUND

One of the features in the Long Term Evolution (LTE) standard is evolved multimedia broadcast multicast services (eMBMS), which enables broadcast and multicast services over a cellular network. Using LTE eNodeBs, the eMBMS feature allows media content to be distributed once and received by many end users in the same geographic region. In this manner, network operators may be able to increase efficiency when offering media services, for example, real-time streaming or file download services.

SUMMARY

Systems, methods, and devices of the various embodiments enable a middleware on an eMBMS capable wireless device to determine logging behavior for cases in which multiple applications that are registered for or consuming an eMBMS service have different opt statuses.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION

Figure 1:
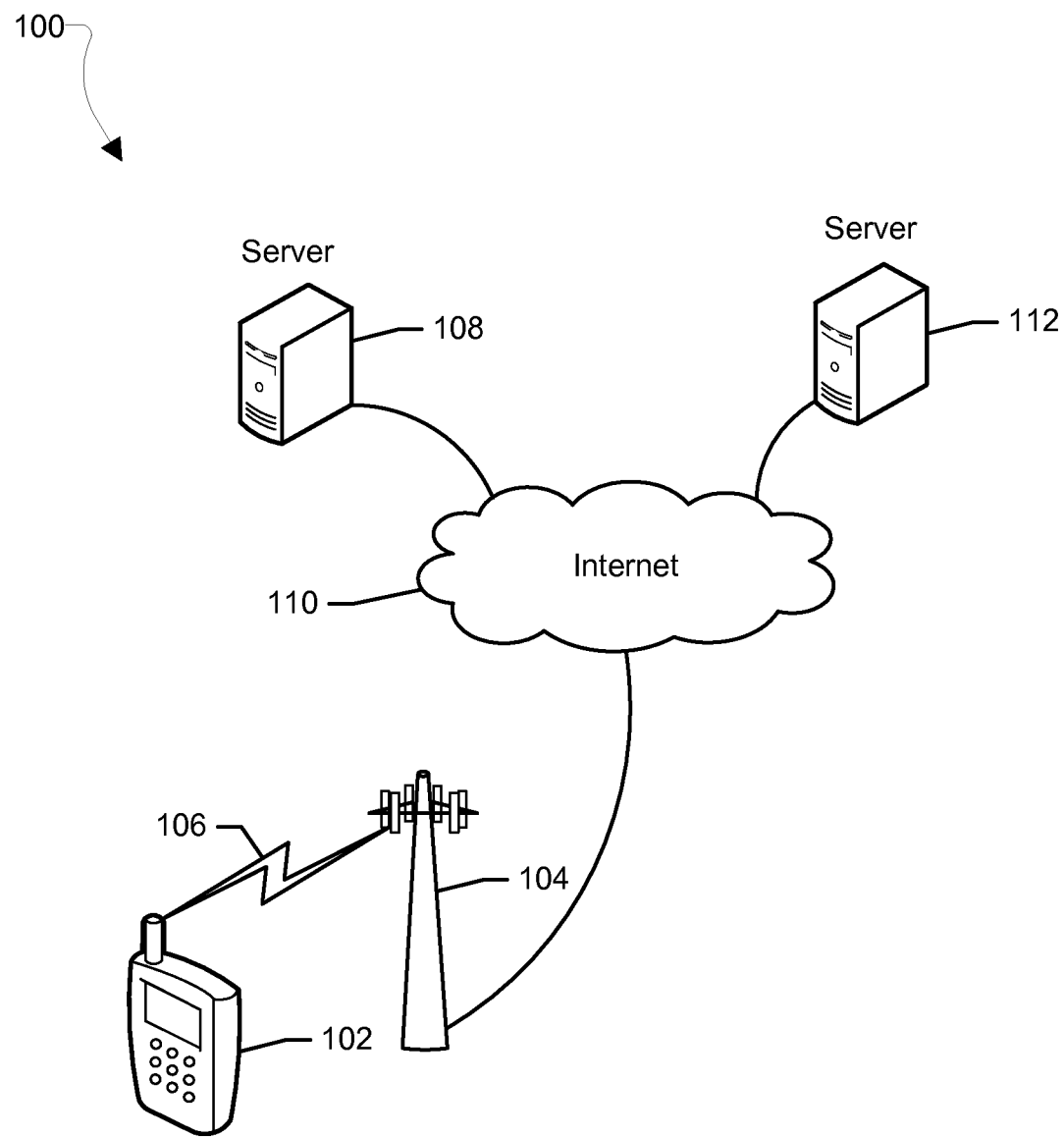
FIG. 1 is a communication system block diagram of a network suitable for use with the various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

As used herein, the terms "wireless device," "mobile device," "wireless communications device," "user equipment," and "receiver device" are used interchangeably to refer to any one or all of cellular telephones, smart phones, personal or mobile multi-media players, personal data assistants (PDA's), laptop computers, tablet computers, smart books, palm-top computers, wireless electronic mail receivers, multimedia Internet enabled cellular telephones, wireless gaming controllers, and similar personal electronic mobile devices which include a programmable processor and memory and circuitry for initiating and/or receiving voice calls over various networks.

As used herein, the term "services" applies to the distribution of different content streams or files, such as text feeds, HTML feeds, and audio and video feeds, that may be included within a single broadcast signal, such as a multicast transmission or a mobile broadcast TV signal, or within a single transmission signal, such as a cable TV signal. Typically each service is provided by a different service provider which may be the producer or owner of the audio/video content making up the service.

As used herein, the term "reception reporting" refers to a procedure of uploading, from a wireless device to a network, logs with pre-defined Quality of Experience (QoE) metrics collected in the wireless device middleware for an eMBMS service.

As used herein, the term "opt status," when applied to an application, refers to a parameter with a value of either "opt in" or "opt out" that dictates the user's selection for the application of whether to participate in reception reporting. The opt status of an application may be set, for example, by a user or by a network operator. When applied to a service, the term "opt status" refers to the result of a logical operation on the opt statuses of applications consuming or interested in consuming a service.

As used herein, the term "middleware" refers generally to computer software that provides services to applications beyond those available from the operating system.

The Long Term Evolution (LTE) access solution is based on the evolution of the Universal Mobile Telecommunications System (UMTS) radio access through the Evolved UTRAN (E-UTRAN). LTE together with the Evolved Packet Core (EPC) network (core network accommodating LTE) make up an Evolved Packet System (EPS). While the access network in UMTS emulates a circuit switched connection for real time services and a packet switched connection for datacom services, the Evolved Packet System (EPS) is purely IP based, and both real time services and datacom services may be carried by the IP protocol.

LTE uses Orthogonal Frequency Division Multiple Access (OFDMA) technologies, and is an all-IP system that provides an end-to-end IP connection from the mobile equipment to the core network. Applications in LTE are supported by the IP Multimedia Subsystem (IMS), which is a standardized architectural framework for IP-based multimedia services.

LTE Evolved Multicast Broadcast Multimedia Service (eMBMS) is a technology for providing common media content to a large number of users. The LTE spectrum for unicast transmission may be reused to support eMBMS. That is, since LTE resources are only reserved for eMBMS when needed, without impacting unicast capacity at other times, existing LTE carriers may be flexibly allocated between unicast and broadcast. Thus, eMBMS may provide higher efficiency and lower cost to the network for providing common content.

The various embodiments provide mechanisms to manage the collection or transmission of reception reports when multiple applications on a wireless device have different user-defined opt statuses for reception reporting with respect to the same eMBMS service. Specifically, the embodiments methods present algorithms with varying levels of accuracy versus expedience to calculate an opt status of an eMBMS service, and based on the opt status, determine whether to log reception metrics during and/or upload a reception report after, a session of the eMBMS service.

While a media service is on, applications on an eMBMS-capable device may consume the service while reception metrics for the service, such as network resources, object losses, initial and re-buffering duration, etc., may be logged in middleware. Since users may not want to participate in such reception reporting, for example due to privacy reasons, users may be given a choice for each application to opt in or opt out of reception reporting. For example, middleware may provide an interface to the application to enable selecting an opt status for the service class of interest. However, since multiple applications may be registered for or consume a particular eMBMS service, the middleware may be presented with conflicting opt in/out status selections for that eMBMS service.

While the systems and methods herein are described with reference to an eMBMS network, the various embodiments may be implemented in multicast networks, cable television, over-the-air television broadcast networks, satellite television networks, and any other communication system implementing reporting of measurements related to use of a service and in which a plurality of communication services are aggregated in a central location and defined combinations of communication services are selected for broadcast to the end user. A number of other mobile broadcast television services and broadcast standards may be available or contemplated in the future, all of which may implement and benefit from the various embodiments. Such services and standards may include, for example, Open Mobile Alliance Mobile Broadcast Services Enabler Suite (OMA BCAST), Digital Video Broadcast IP Datacasting (DVB-IPDC), China Multimedia Mobile Broadcasting (CMMB), and Multicast Broadcast Multimedia Service (MBMS). Thus, references to particular multicast technologies or mobile broadcast television technologies are not intended to limit the scope of the claims to such technologies unless specifically recited in a claim.

The systems and methods described herein refer to reception reporting; however, the various embodiments may be implemented for any user sensitive information associated with a shared resource. For example, multiple users with different opt-in/opt-out statuses may be using a video conferencing tool. In that case, the same algorithm and embodiments described in the embodiments may be used to decide whether to collect session quality and usage information related to a video conferencing session.

FIG. 1 illustrates a cellular network system 100 suitable for use with the various embodiments. The cellular network system 100 may include multiple devices, such as a wireless device 102, one or more cellular towers or base stations 104, and servers 108 and 112 connected to the Internet 110. The wireless device 102 may exchange data via one or more cellular connections 106, including CDMA, TDMA, GSM, PCS, 3G, 4G, LTE, or any other type connection, with the cellular tower or base station 104. The cellular tower or base station 104 may be in communication with a router which may connect to the Internet 110. In this manner, via the connections to the cellular tower or base station 104, and/or Internet 110, data may be exchanged between the wireless device 102 and the server(s) 108, 112, 114. In an embodiment, server 108 may be a broadcast operator server controlling the operations of the cellular network including the wireless device 102 and the cellular tower or base station 104 and the provisioning of content to the wireless device 102 from the content servers 112 and 114. In an embodiment, server 112 may be a national or venue content provider server.

Figure 2:
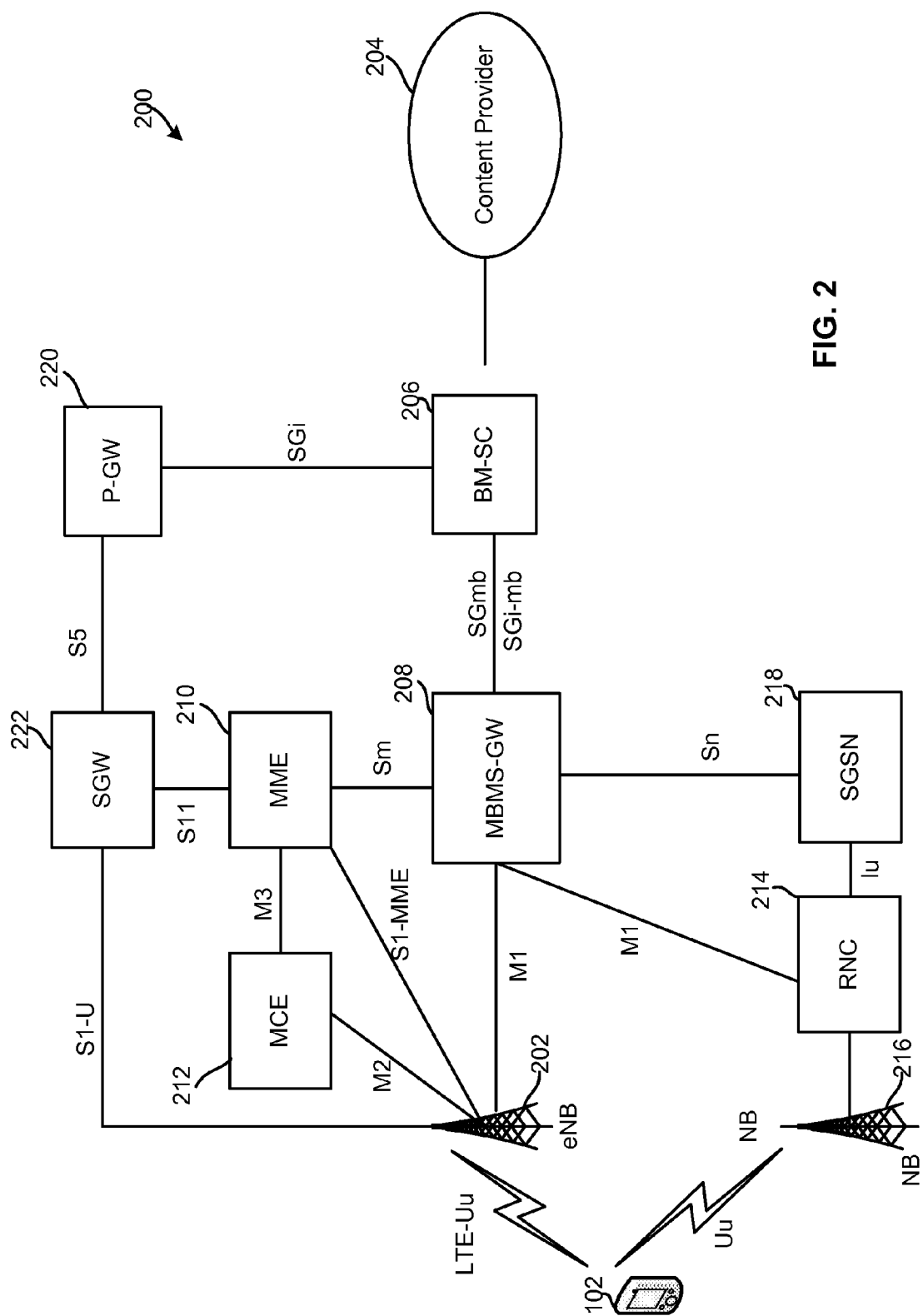
FIG. 2 is system block diagram of an enhanced Multimedia Broadcast Multicast Service (eMBMS) system suitable for use with the various embodiments.

FIG. 2 illustrates components of an eMBMS communications system 200, which may reuse many LTE E-UTRAN elements. In eMBMS communications system 200, wireless device(s) 102 may be connected to an eNodeB 202 (i.e., LTE base station). The eNodeB 202 may communicate with wireless devices 102 via an air interface, such as a Long Term Evolution (LTE) Uu (User equipment (UE) to Universal terrestrial radio access network (UTRAN)) interface.

One or more content providers 204 may provide various eMBMS services to be transmitted to the wireless devices 102 by sending the services to a Broadcast Multicast Service Center (BM-SC) 206. The BM-SC 206 may multiplex the services, and may provide a multiplex signal to a Multimedia Broadcast Multicast Service gateway (MBMS-GW) 208 via a communication interface (SGmb). The MBMS-GW 208 may be connected with an eNodeB 202 via an M1 interface. The M1 interface may be a user plane interface and make use of Internet protocol (IP) multicast protocol for packet delivery. Other types of wireless and cellular telephone communication protocols and interfaces may also be used.

The MBMS-GW may also be connected to a Mobility Management Entity (MME) 210 via an Sm interface for session control purposes as is the discussed later. The MME 210 may be connected to the eNodeB 202 via an S1-MME interface. The MME 210 may be connected to a Multi-cell/Multicast Coordination Entity (MCE) 212 via an M3 interface. The MCE 310 may be connected to the eNodeB 202 via an M2 interface. In alternate embodiments, one or more Multi-cell/Multicast Coordination Entities may be integrated with or within one or more eNodeB 202.

The MBMS-GW 208 may be connected to a Radio Network Controller (RNC) 214 via a M1 interface. The RNC 214 may be connected to a nodeB 216 which may communicate with wireless devices 102 via an air interface, such as Uu. The MBMS-GW 208 may be connected to a Serving GPRS (General Packet Radio Service) Support Node (SGSN) 218 via an Sn Interface. The SGSN 218 may be connected with the RND 214 via an Iu interface.

The BM-SC 206 may communicate with a public data network (PDN) gateway (P-GW) 220 via an SGi interface. The P-GW 220 may be connected to a signaling gateway (SGW) 222 via an S5 interface. The SGW 222 may be connected to the MME 210 via an S11 interface. The SGW 222 may be connected to the eNodeB 202 via an S1-U interface.

The BM-SC 206 may manage the scheduling of broadcast and multicast sessions. A session may correspond to a service to be broadcast or multicast. Session control signaling, such as messages for session initiation and termination, may propagate to one or more eNodeBs 202 from the BM-SC 206.

A streaming eMBMS service may include a streaming component and a file download component, and an eMBMS-capable wireless devices may consume an eMBMS service (e.g., real-time streaming service or file download service) when a broadcast-enabled application is registered or otherwise indicated for the service. While a service is on, middleware may collect reception logs of pre-defined QoE parameters.

Figure 3A:
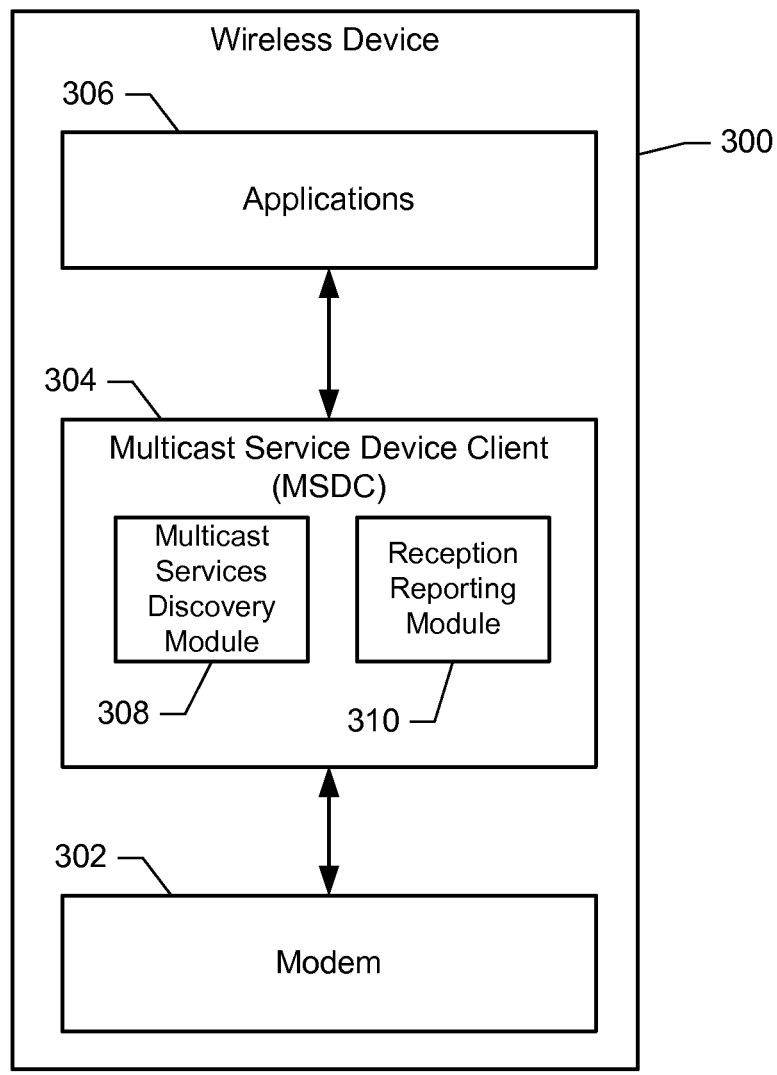
FIG. 3A is a block diagram illustrating the architecture of a wireless device according to an embodiment.

FIG. 3A illustrates a wireless device architecture according to an embodiment. A wireless device 300, such as wireless device 102 in FIGS. 1 and 2, may include a modem layer 302. The modem layer 302 may be implemented as a broadcast-enabled LTE modem, and may manage all radio aspects of the wireless device 300, such as acquisition, handoff, link maintenance, etc. The modem layer 302 may also decode a received eMBMS bearer signal and deliver Internet Protocol (IP) packets to a multicast service device client (MSDC) 304 in middleware. MSDC 304 may be a services layer of the wireless device 300 that recovers segments from IP packets delivered in a service, and makes segments available to applications 306, such as those registered with the service class in which the service is defined.

In the various embodiments, the opt status of broadcast-aware applications may be considered in order to determine whether to log or transmit reception metrics in a particular instance. For example, for each application, a user may set an opt status (i.e., "opt in" or "opt out") that dictates middleware reception reporting behavior for the service class or classes with which the application is registered.

The MSDC 304 may further include a reception reporting module 310 that may provide reception reporting to the network by logging reception metrics and uploading collected reception logs to the network. In an illustrative embodiment, the reception reporting module 310 may track and manage reception metrics for quality of service (QoS)/quality of experience (QoE) issues. The reception reporting module 310 may receive delivery status control information, such as via a FLUTE protocol for file download services, or via a RTP Control Protocol (RTPCP) or DASH protocol for streaming services. The logging information from different devices may be uploaded by a reception report module 310 to a server, which may analyze statistics of service usage as desired.

The functional modules in the MSDC 304 (e.g., multicast services discovery module 308 and reception reporting module 310) may be implemented in software, e.g., via computer executable instructions stored in a memory, or via hardware, e.g., as one or more ASIC. In addition, MSDC 304 may interface with data networks, as well as with the user of the wireless device via an end-user interface (e.g., keys, buttons, dials, display screens, speakers, etc., of the mobile terminal device). Reception reporting may provide information to a network operator regarding whether an object or file has been correctly received at a device, such as a wireless device 102, 300. The network operator may use the metric received from one or more wireless devices, for example, to adjust the transmission settings for additional data transmissions. In the embodiments, separate reception reporting schemes may be employed for different types of data transmission.

In an embodiment, a middleware component such as MSDC 304 may also provide an API or other interface that allows the MSDC 304 to receive an opt status from a broadcast-aware application, and that allows the application's opt status to control whether reception logging and/or reporting is performed, for example, by the reception reporting module 310. The opt status of the broadcast-aware application may be stored, for example, by a multicast services discovery module 308 of the MSDC 304. In response to a user input, the broadcast-aware application may invoke a function associated with the API to change the opt status for the service class. The API, in turn, may instruct the reception reporting module 310 to begin or discontinue logging reception metrics, or to authorize or cancel reception reporting, for that particular application.

Figure 3B:
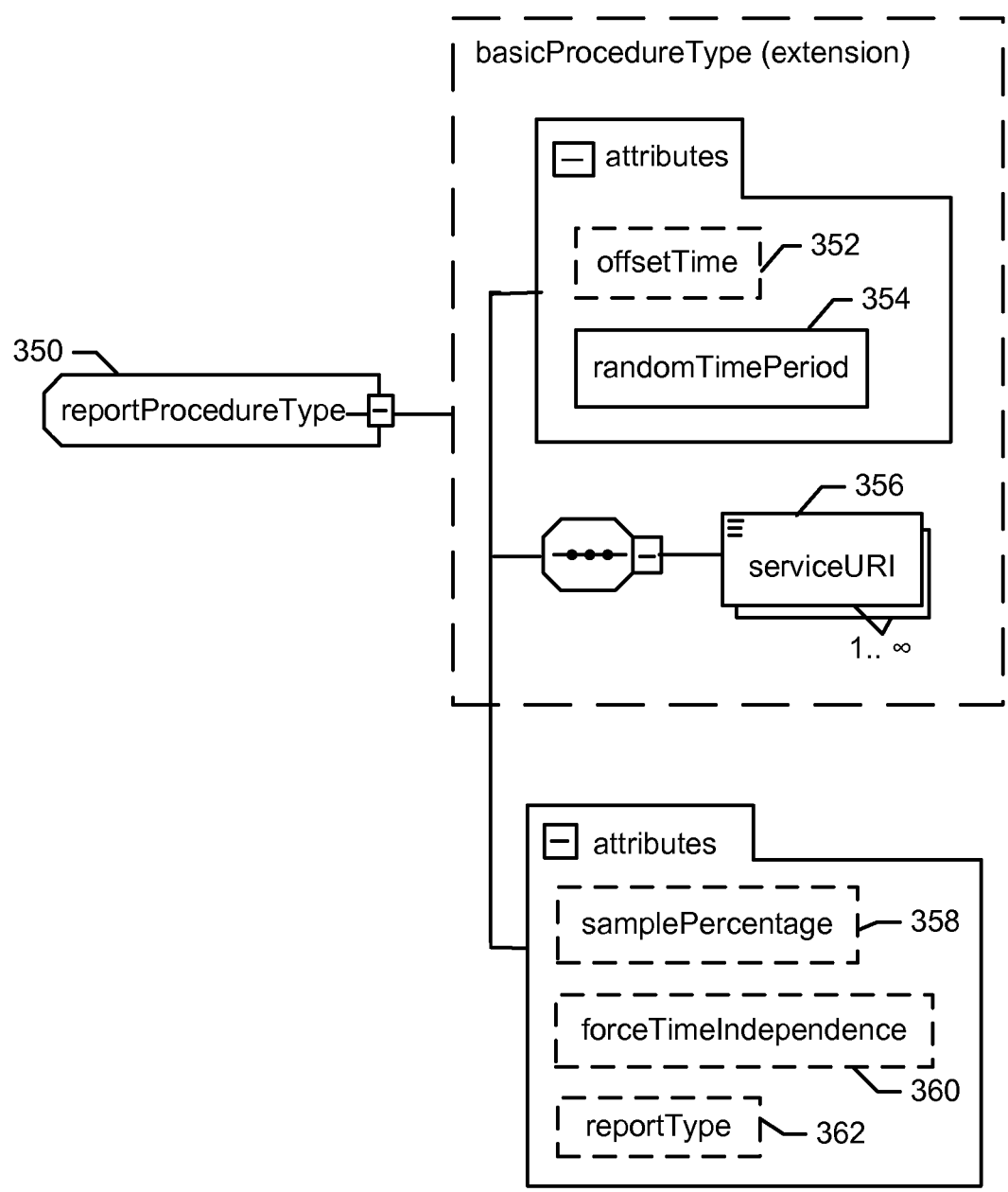
FIG. 3B is a data structure diagram illustrating potential elements of a reception reporting configuration file according to an embodiment.

FIG. 3B shows elements of an example reception reporting configuration file 350. In an embodiment, the configurations for a report procedure may include data elements such as offsetTime 352 and randomTimePeriod 354, which together define a time period before a reception report may be sent to the network. Other data elements may include one or more service uniform resource identifiers that reflect the server names where the reception reports will be uploaded (serviceURI 356), the percentage of wireless devices which should participate in reporting for that service (samplePercentage 358), an indicator of whether a unicast repair service can be used to upload collected reception logs (forceTimeIndependence 360), and an indicator of the type of information reported, including whether to include statistical information and failed receptions (reportType 362).

Example reportType values may include, for example, Reception Acknowledgment (RAck), in which only successful receptions are reported; Statistical Reporting for successful Reception (StaR), in which only successful reception is reported and includes reception details for statistical analysis; and Statistical Reporting for all content Reception (StaR-all), in which all reception is reported and includes reception details for statistical analysis. In an embodiment, the samplePercentage attribute is only used with StaR and StaR-all.

In the various embodiments, the samplePercentage attribute may be optional, and may default to 100% when it is not present (i.e., each wireless device which entered the service session should participate in reception reporting). If the samplePercentage is less than 100%, the wireless device may generate a number between 1 and 100, and may participate in reception reporting if the generated number is lower than the samplePercentage value. The generated number may be generated, for example, using a pseudorandom algorithm or other suitable algorithm.

When multiple applications register for a service and set different opt statuses for reception reporting, the middleware may need to employ some way to prioritize and/or select between applications' logging preferences. The various embodiments provide algorithms that determine reception logging/reporting by generating a single opt status for the service. In the embodiments, the service opt status may be calculated by combining the opt statuses of some or all applications registered with, consuming, or interested in the service contents.

The embodiment methods for determining reception reporting and/or logging may vary based on trade-offs between specificity and expedience with respect to assumptions made about an application's use of a service. For example, the selectivity in identifying an application as using the service, as well as the point at which the opt status may be generated, may differ among the various approaches.

In the various embodiments, a reception reporting module may log reception metrics during a service session, and may collect reception logs when the service session ends. The user's opt status for each application in the eMBMS system may be stored in a multicast service discovery module in middleware.

Figure 4:
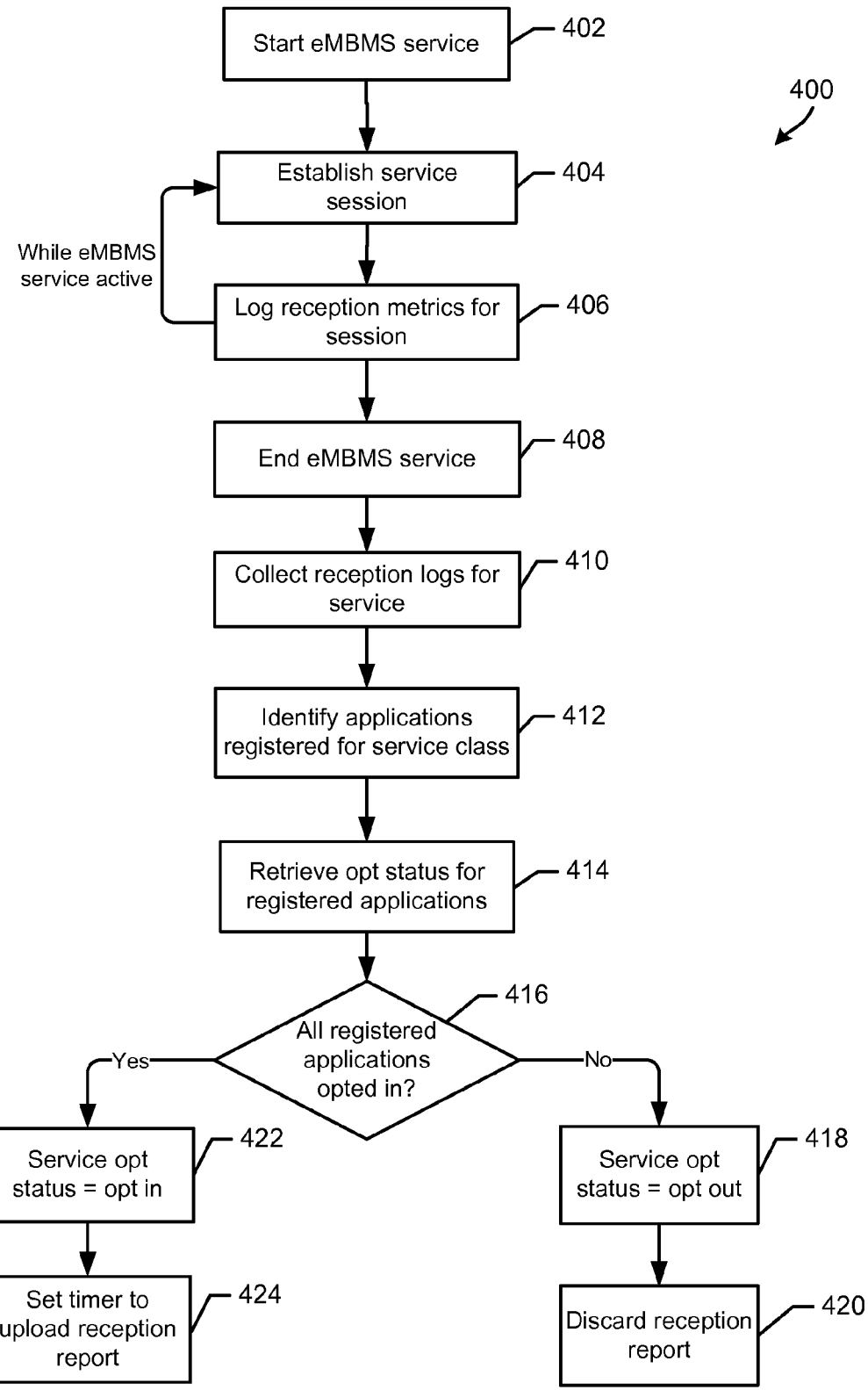
FIG. 4 is a process flow diagram illustrating an embodiment method for determining whether middleware will upload reception logs for an eMBMS service.

FIG. 4 illustrates an embodiment method 400 for determining whether an eMBMS-capable wireless device will participate in a reception reporting process for an eMBMS service. In block 402, an eMBMS service may be started, for example, in response to user input initiating an application that is interested in the service. A service session to deliver the service content and in-band control information may be established, block 404. Such session may use, for example, Real-time Transport Protocol (RTP) or Dynamic Adaptive Streaming over HTTP (DASH) for a streaming service, or File Delivery Unidirectional Transport (FLUTE) for a file download service. In block 406, reception metrics may be logged during the session, for example, by a reception reporting module. In block 408 the service session may end. The steps of establishing a session in block 404 and logging reception metrics in block 406 may be repeated while the eMBMS service is still active. Once the eMBMS service ends, block 408, the reception reporting module may collect the reception logs for the service, block 410. In block 412, the middleware may identify the applications on the device that are registered for the particular service class to which the eMBMS service belongs. In block 414, the middleware may retrieve the opt status for some or all of the applications that are registered for that particular service class (e.g., either "opt in" or "opt out" for each application). The applications registered with the service class may have previously provided their opt statuses to a multicast service discovery module in the middleware. A logical operation may be performed on the opt statuses of the applications registered for the service class, and the result may be used to generate an opt status for the service. For example, using a logical AND operation, the middleware may generate an opt status for the service by determining whether all applications registered for the service class have an opted in status, determination block 416.

If one or more applications registered for that service class does not have an "opt in" status (i.e., determination block 416="No"), an "opt out" status may be generated for the service, block 418, and the collected reception reports may be discarded by purging the logged reception metrics, block 420. If the samplePercentage parameter indicates participation (e.g., a pseudorandom number generated is less than samplePercentage value), and if none of the applications that are registered for that service class have an "opt out" status (i.e., determination block 416="Yes"), an "opt in" status may be generated for the service, block 422. In block 424, a timer may be set for a reception report (i.e., collected reception logs) to be uploaded to the network by the reception reporting module. In alternative embodiment (not shown), a logical OR operation may be used instead of the logical AND in order to generate the service opt status. For example, using a logical OR operation, the middleware may instead determine whether any application registered for the particular service class has an "opt in" status.

Since the decision of whether to upload reception reports may be made after the service is ended, reception metrics may be logged during the service session, regardless of whether such reports are ultimately uploaded to the network. Thus, this embodiment may be expedient because it involves few determinations in advance in the middleware, but may provide excessive energy consumption by logging reception metrics for sessions in which it is unnecessary and ultimately counter-productive.

Further, middleware may track and record timestamps at which applications have activated or deactivated an eMBMS service (e.g., an activation/deactivation event), as well as the opt status of the applications upon detecting the activation/deactivation event. In an embodiment, the history of the applications' opt statuses and applications' activation/deactivation events may be used in generating the service opt status.

Figure 5:
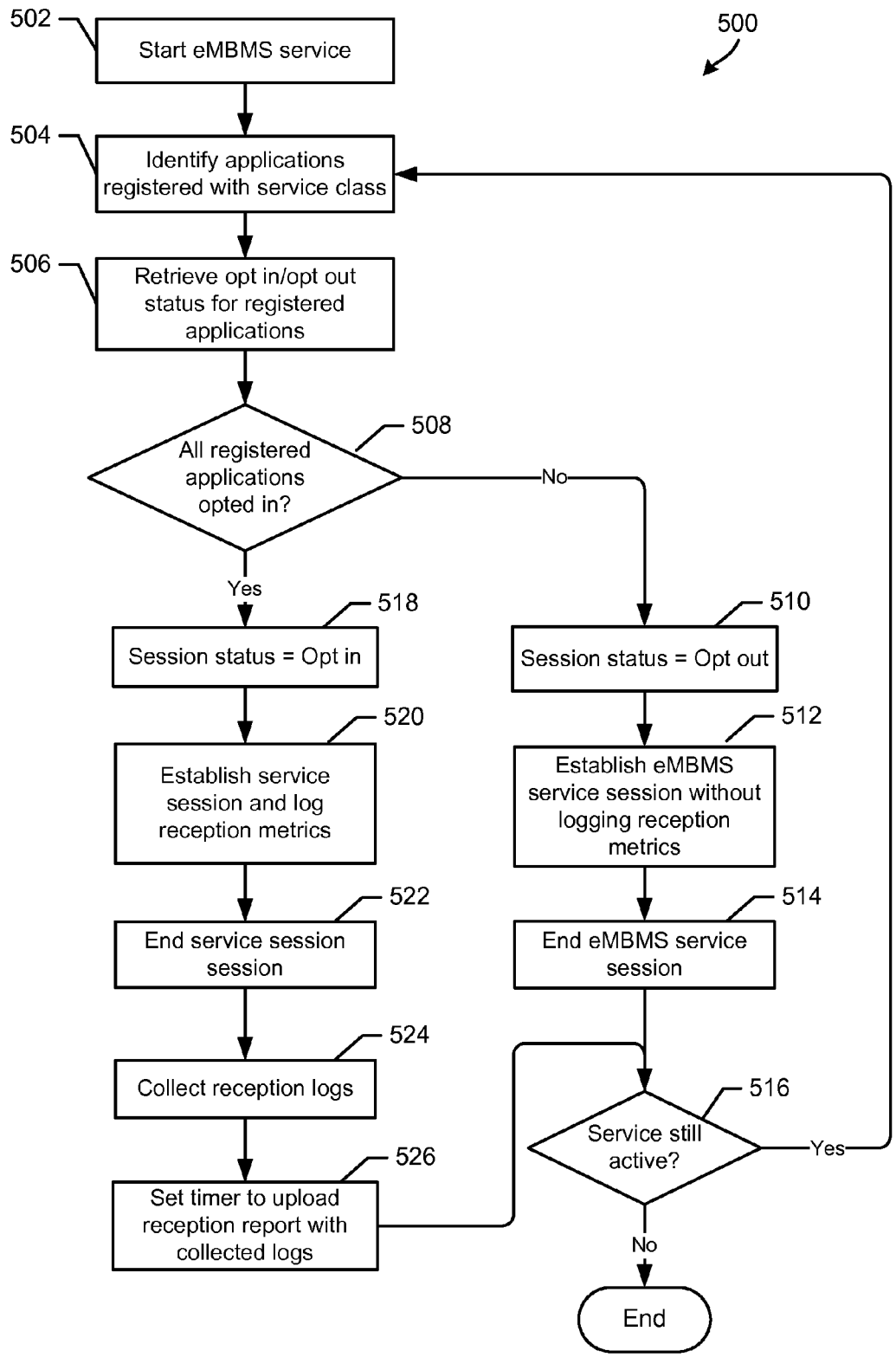
FIG. 5 is a process flow diagram illustrating another embodiment method for determining whether middleware will collect and upload reception logs for an eMBMS service.

FIG. 5 illustrates another embodiment method 500 for determining whether an eMBMS-capable wireless device will participate in a reception reporting process for an eMBMS service. In block 502, an eMBMS service may be started. In block 504, middleware may identify applications on the device that are registered with the service class in which the service is defined. In block 506, middleware may retrieve the opt status (e.g., "opt in" or "opt out") of some or all of the registered applications. For example, the applications registered with the service class may have previously provided their opt statuses to a multicast service discovery module in the middleware.

A logical operation may be performed on the opt statuses of the applications registered for the service class, and the result may be used to generate an opt status for the service. For example, using a logical AND operation, the middleware may generate an opt status for the service by determining whether all applications registered for the service class have an "opt in" status, determination block 508. If one or more applications registered for that service class does not have an "opt in" status (i.e., determination block 508="No"), an "opt out" status may be generated for the service, block 510. In block 512, a service session may be established to deliver the eMBMS service content and control information (e.g., via RTP, DASH, or FLUTE protocol) without logging reception metrics. For example, a MSDC data distribution module may provide delivery status information to the reception reporting module, but no log is created for such information. In block 514, the service session may end, and in block 516 the middleware may determine whether the service is still active at the device. If the service is still active (i.e., determination block 516="Yes"), the method may return to block 504 in order to again identify which applications are registered with the service class for a next service session. If the service is not still active (i.e., determination block 516="No"), the process may end.

If the samplePercentage parameter indicates participation (e.g., a pseudorandom number generated is less than samplePercentage value), and if all applications registered for the particular service class have an "opt in" status (i.e., determination block 508="Yes"), an "opt in" status may be generated as the service opt status, block 518. In block 520, a service session may be established to deliver the eMBMS service content and control information (e.g., via RTP, DASH, or FLUTE protocol), and reception metrics may be logged for the duration of the session. In block 522, the service session may end, and in block 524 the reception reporting module may collect reception logs from the session. In block 526, a timer may be set for a reception report (i.e., collected reception logs) to be uploaded to the network from the reception reporting module. Following uploading, the method may proceed to determination block 516, which was discussed above.

Thus, in method 500, the reception reporting module logs reception metrics during the session only if the opt status for the service before the session starts is "opt in." By determining in advance whether to log reception metrics during each session based on applications' opt statuses before the session starts, the middleware may also handle changes in an application's opt status or registration for the next reporting session. That is, if an application that is registered with the service class of the eMBMS service changes its settings during the session (e.g., changes opt status, service class registration, etc.), such change may be recognized and applied for the next session by virtue of the decisions that are performed before each session starts.

Figure 6A:
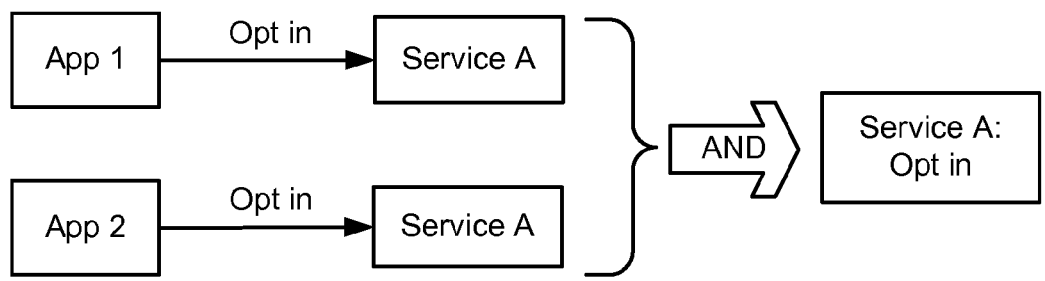
FIGS. 6A and 6B are schematic diagrams illustrating the implementation of example logical operations to calculate the opt status of an eMBMS service.
Figure 6B:
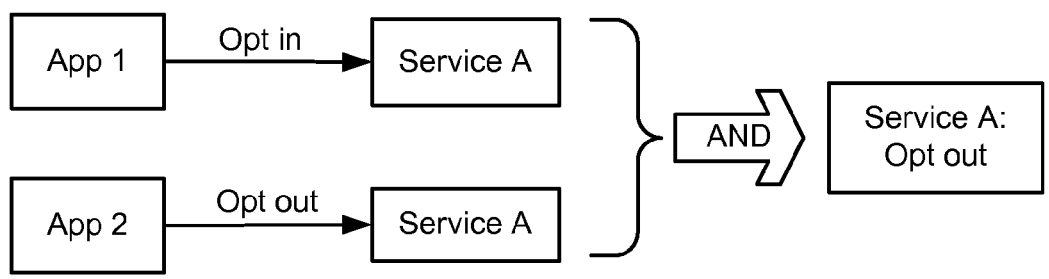

FIGS. 6A and 6B illustrate example results of the logical AND operation applied to the opt statuses of registered applications, as may be performed in determination block 416 of FIG. 4 and/or determination block 508 of FIG. 5.

Referring to FIG. 6A, App1 and App2 may be a set of applications that have registered with the service class in which a Service A is defined. In this example, App1 and App2 may both have an "opt in" status set for the service class of Service A. The logical AND may therefore result in an "opt in" status for Service A. Referring to FIG. 6B, App1 may have an "opt in" status set for the service class of Service A, while App2 may have an "opt out" status set for the service class of Service A. The logical AND may therefore result in an "opt out" status Service A.

Figure 7:
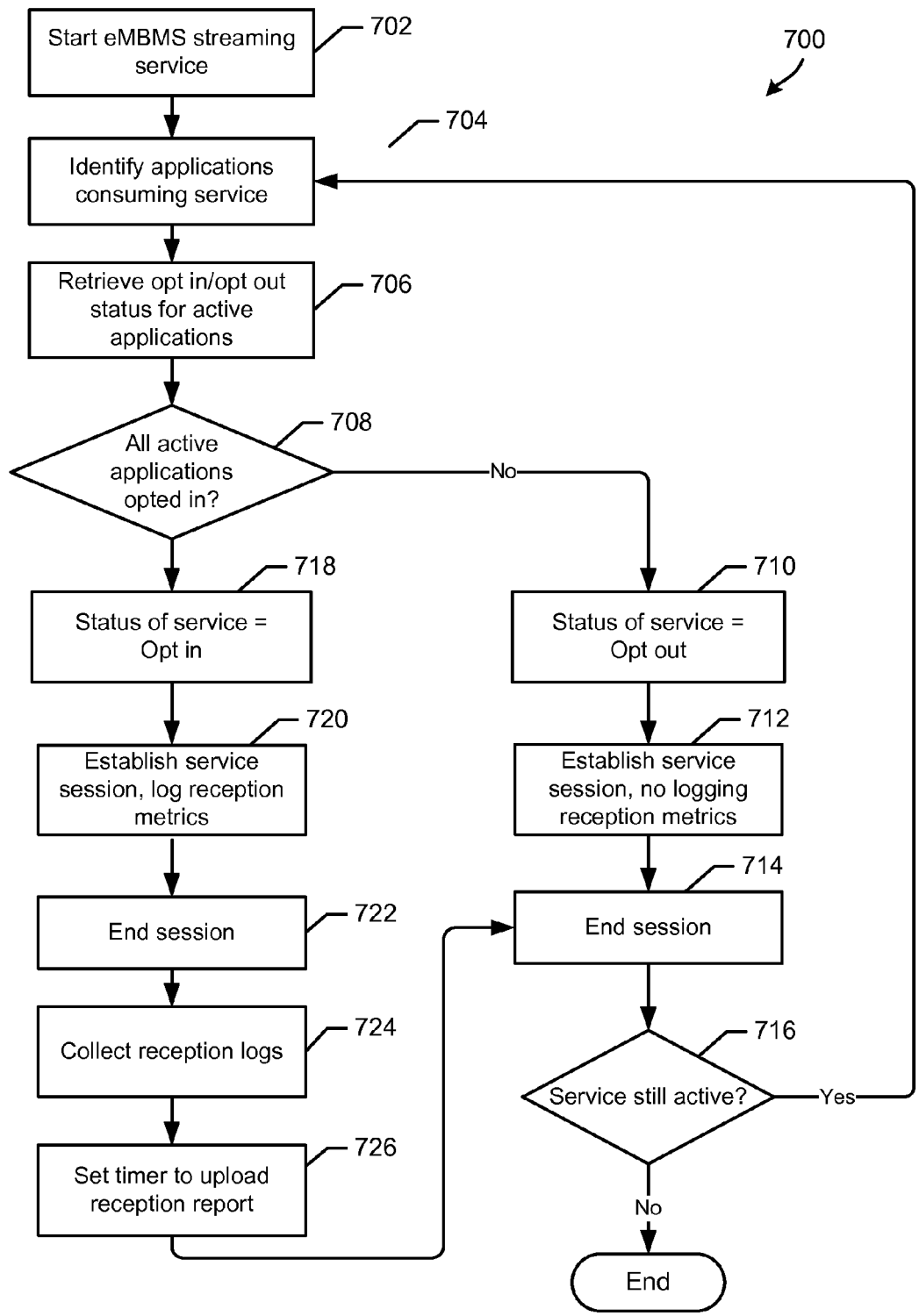
FIG. 7 is a process flow diagram illustrating an embodiment method for determining whether middleware will collect and upload reception logs for an eMBMS streaming service.

In another embodiment, illustrated in FIG. 7, middleware (e.g., MSDC) may determine in advance whether to log reception metrics during a session of a streaming eMBMS service based on applications that are actually consuming the service. In method 700, an eMBMS streaming service may be started, block 702. In block 704, the MSDC may identify the applications that are consuming the service. In block 706, the MSDC may obtain the opt status (e.g., "opt in" or "opt out") for some or all of the identified consuming applications. A logical operation may be performed on the opt statuses of the applications, and the result may be used to generate an opt status for the service. For example, using a logical AND operation, the middleware may generate an opt status for the service by determining whether all of the applications consuming the service have set an "opt in" status, determination block 708. If one or more applications consuming the service has not set an "opt in" status (i.e., determination block 708="No"), the opt status generated for the service may be "opt out," block 710.

In block 712, a service session may be established to deliver specific content, such as a particular multimedia stream (e.g., via RTP or DASH), without logging reception metrics. For example, a MSDC data distribution module may provide delivery status information to the reception reporting module, but no log of such is created for such information. In block 714, the service session may end, and in block 716 the middleware may determine whether the service is still active at the device. If the service is still active (i.e., determination block 716="Yes"), the method may return to block 704 to again identify the applications that are consuming the service in a next service session. If the service is not still active (i.e., determination block 716="No"), the process may end.

If the samplePercentage parameter indicates participation (e.g., a pseudorandom number generated is less than samplePercentage value), and if all applications actively consuming the service have an "opt in" status (i.e., determination block 708="Yes"), an "opt in" status may be generated for the service in block 718. In block 720, a service session may be established to deliver the eMBMS service content and control information (e.g., via RTP and RTPCP, via DASH, etc.), and reception metrics may be logged for the duration of the session. In block 722, the service session may end, and in block 724 the reception reporting module may collect reception logs from the session. In block 726, a timer may be set for a reception report (e.g., collected reception logs) to be uploaded to the network from the reception reporting module. Following uploading, the method may proceed to determination block 716, which was discussed above.

While embodiment method 700 may require more steps than methods 500 and 600, it may provide a more accurate determination of the opt status for the service by operating on the application level. That is, by identifying applications that are actually consuming the service, instead of those that are registered for the service class, the determination of whether to participate in reception logging and reporting processes may be based on a better set of data.

Figure 8A:
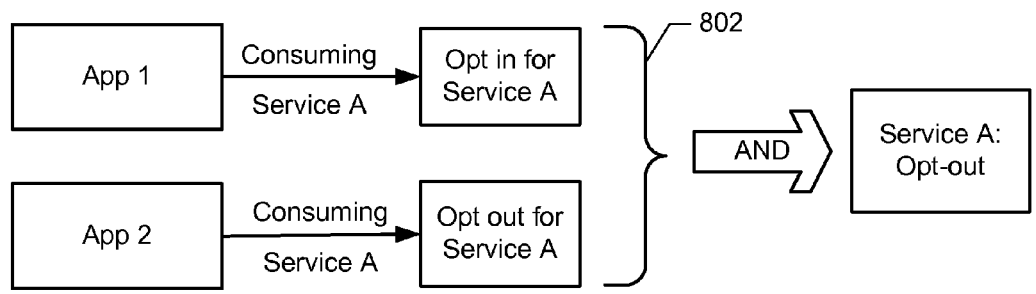
FIGS. 8A and 8B are schematic diagrams illustrating the implementation of example logical operations to calculate the opt status of an eMBMS streaming service.
Figure 8B:
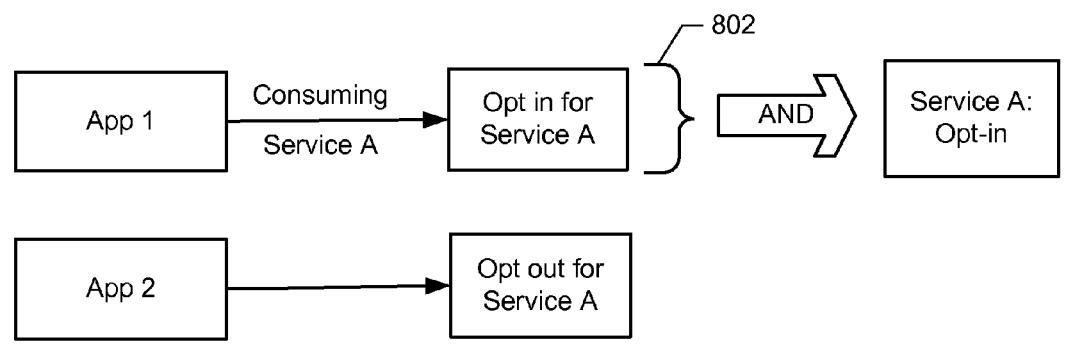

FIGS. 8A and 8B illustrate example results of the logical AND operation applied to the opt statuses of applications consuming a streaming service, as may be performed in determination block 708 of FIG. 7. Referring to FIG. 8A, App1 and App2 may be applications that are registered with the service class in which a streaming Service A is defined. In this example, App1 may have set an "opt in" status for the service class of Service A, and may be actively consuming Service A. App2 may have set an "opt out" status for that service class, and may also be actively consuming Service A. Because the "opt out" status of App2, which is included within the group of applications that are actively consuming Service A, illustrated in bracket 802, the logical AND may result in an "opt out" status generated for Service A.

Referring to FIG. 8B, App1 may have set an "opt in" status for the service class of Service A, and may be consuming Service A. App2 may have set an "opt out" status for that service class, and may not be consuming Service A. Since the logical AND is applied only to those applications actively consuming Service A, which does not include App2 indicated by bracket 802, the logical AND may result in Service A having an "opt in" status 806.

Figure 9:
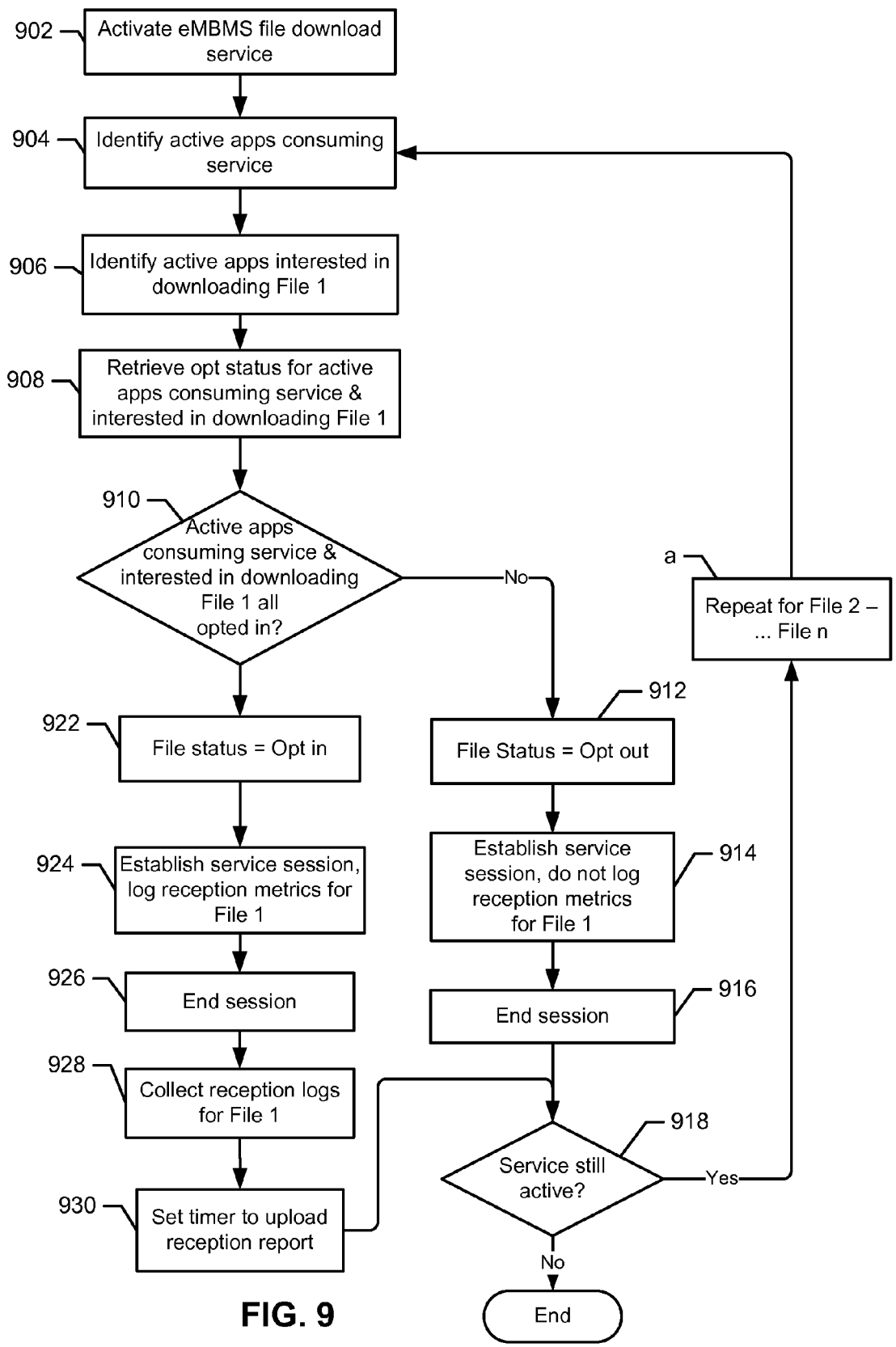
FIG. 9 is a process flow diagram illustrating an embodiment method for determining whether middleware will collect and upload reception logs for an eMBMS file download service.

FIG. 9 illustrates an embodiment method 900 for deciding whether to participate in reception reporting in middleware (e.g., MSDC). Method 900 is similar to method 700, but applied to an eMBMS file download service. In block 902, an eMBMS service may be activated. In block 904, middleware may identify active applications on the device that are consuming the service, and in block 906 middleware may identify active applications on the device that are interested in downloading a particular file (e.g., File 1) in the service. In block 908, the middleware may retrieve the opt status (e.g., "opt in" or "opt out") of the identified applications.

A logical operation may be performed on the opt statuses of the active applications interested in downloading File 1, and the result may be used to generate an opt status for the file in the service. For example, using a logical AND operation, the middleware may obtain an opt status for the file in the service by determining whether all active applications that are interested in downloading File 1 have set an "opt in" status, determination block 910. If one or more active applications interested in downloading File 1 has not set an "opt in" status (i.e., determination block 910="No"), an "opt out" status may be generated for File 1 in the service, block 912. In block 914, a service session may be established to deliver specific content, such as File 1 (e.g., via FLUTE), without logging reception metrics. For example, a MSDC data distribution module may provide FLUTE in-band delivery status information to the reception reporting module, but no log of such is created for such information.

In block 916, the service session may end, and in block 918 the middleware may determine whether the service is still active at the device. If the service is still active (i.e., determination block 918="Yes"), the method may be repeated for other files in the service (i.e., File 2, File 3 . . . File n), block 920. If the service is not still active (i.e., determination block 918="No"), the process may end.

If the samplePercentage parameter indicates participation (e.g., pseudorandom number generated is less than samplePercentage value), and if all active applications that are interested in downloading File 1 have set an "opt in" status (i.e., determination block 910="Yes"), an "opt in" status may be generated for the file in the, block 922. In block 924, a service session may be established to deliver the service content including File 1 and in-band control information (e.g., via FLUTE), and reception metrics may be logged. In block 926, the service session may end, and the reception reporting module may collect reception logs for File 1 in the service, block 928. In block 930, a timer may be set for a reception report (e.g., collected reception logs) to be uploaded to the network from the reception reporting module. The method may proceed to determination block 918, as discussed above.

Figure 10A:
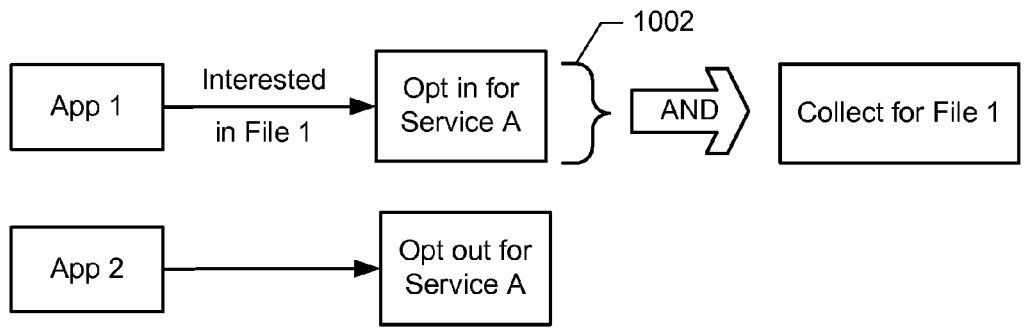
FIGS. 10A-10C are schematic diagrams illustrating the implementation of example logical operations to calculate the opt status of an eMBMS file download service.
Figure 10B:
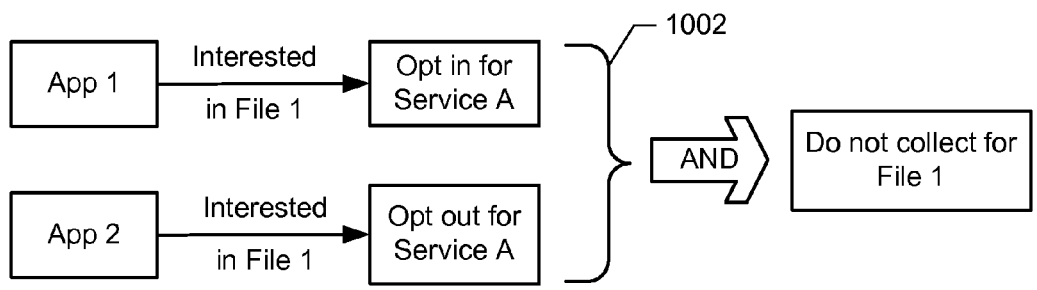

FIGS. 10A and 10B illustrate example results of a logical AND operation applied to the opt statuses of applications consuming a file download service, as may be performed in determination block 910 of FIG. 9.

Referring to FIG. 10A, App1 and App2 may be applications that are registered with the service class of Service A. In this example, App1 may have set "opt in" status for the service class of Service A, a file download service, and may be interested in downloading File 1. App2 may have set an "opt out" status set for that service class, and may not be interested in downloading File 1. The opt status for Service A may be determined with respect to each file, therefore requiring a separate logical AND for each file. In this example, since App2 is not interested in File 1, it may be excluded from the group of applications that are considered in determining the opt status for Service A with respect to File 1, show by bracket 1002. Since in this example the group of applications includes only App1, which has an "opt in" status, the result of the logical AND operation generates an "opt in" status for File 1 in Service A.

FIG. 10B shows the same example parameters as in FIG. 10A but with App2 also interested in File 1. Therefore, in this example, the group of applications that are considered in determining the opt status for Service A with respect to File 1 may include both App1 and App2. Since App2 has set an "opt out" status, the result of the logical AND operation is to generate an "opt out" status for File 1 in Service A.

Figure 10C:
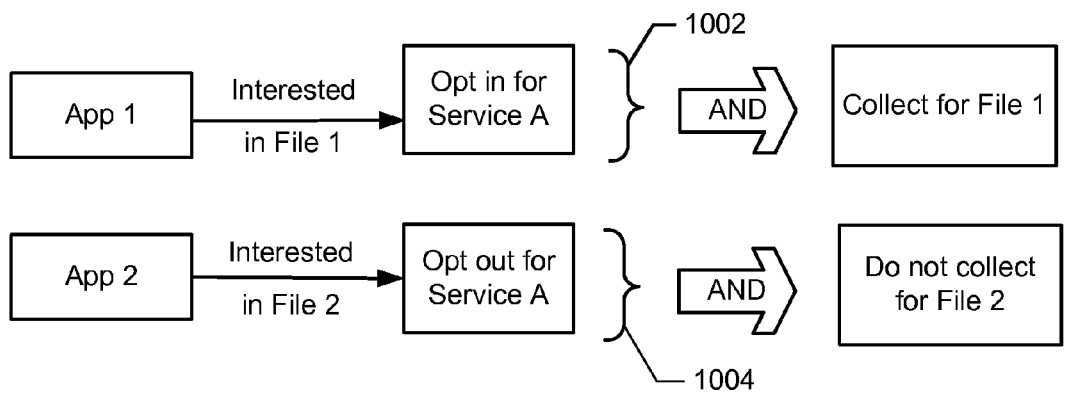

FIG. 10C illustrates example results of two logical AND operations applied to the opt statuses of applications consuming a file download service, corresponding to two different files. In an example, App1 and App2 may be registered with the service class of Service A. App1 may have set an "opt in" status for reception reporting, and may be interested in downloading File 1. App2 may have set an "opt out" status for reception reporting, and may be interested in downloading File 2. Therefore, App1 may be excluded from the group of applications that are considered in determining the opt status for Service A with respect to File 2, shown in bracket 1004, while App2 may be similarly excluded with respect to File 1, shown in bracket 1002. In this scenario, two logical AND results may be obtained for File 1 and File 2, resulting in an "opt in" status generated for File 1 in the service, and an "opt out" status generated for File 2 for the service.

The embodiment methods 400, 500 and 700 described above with reference to FIGS. 4, 5 and 7, respectively, all may include a step of setting a timer for uploading reception reports, if warranted. After a service session has ended, in an embodiment, the reception reporting module may upload a reception report based on reception logs collected from the session. Alternatively, if the next session for the same service starts within an OffsetTime after the end of the previous session, the reception report may not be uploaded, even though the timer may have already been started. Instead, the reception report may be held during the next session and aggregated with the next report (if any). For example, after the second session has ended, the middleware may upload the aggregated reports upon expiration of the original upload timer. If the upload timer has already expired, the aggregated reports may be uploaded immediately.

Figure 11:
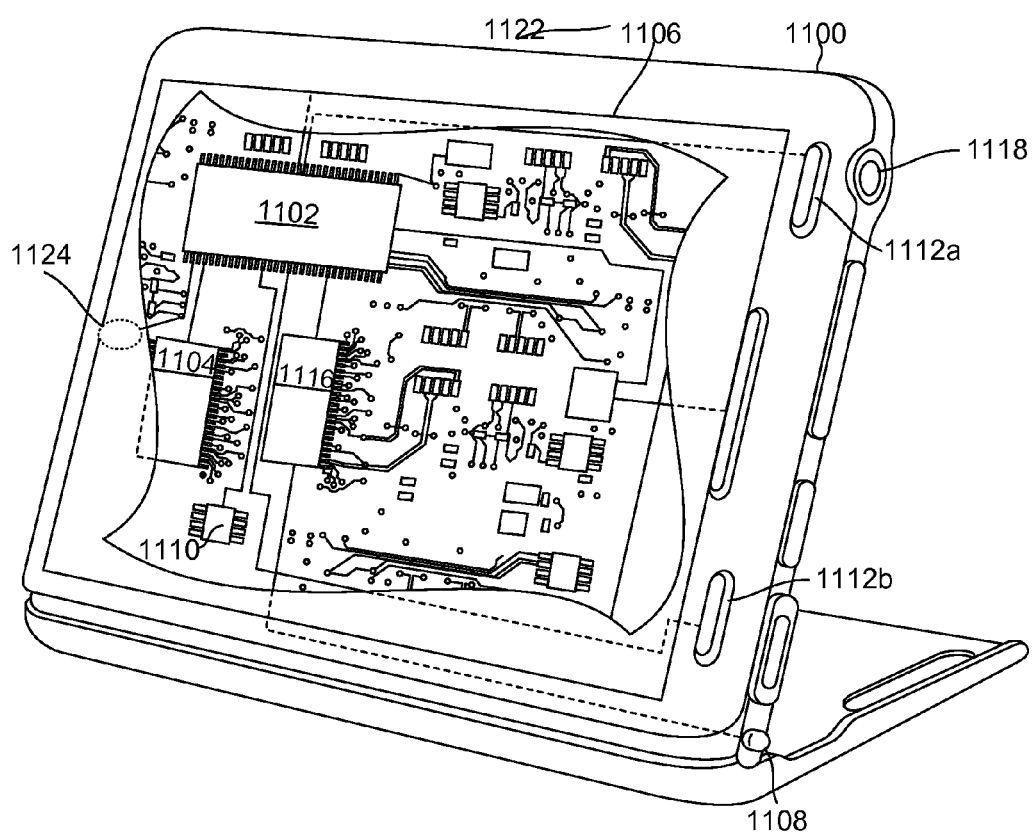
FIG. 11 is a component block diagram of a wireless device suitable for use in an embodiment.

The various embodiments may be implemented in any of a variety of wireless eMBMS-capable wireless devices, an example of which is illustrated in FIG. 11. For example, the wireless device 1100 may include a processor 1102 coupled to internal memories 1104 and 1110. Internal memories 1104 and 1110 may be volatile or non-volatile memories, and may also be secure and/or encrypted memories, or unsecure and/or unencrypted memories, or any combination thereof. The processor 1102 may also be coupled to a touch screen display 1106, such as a resistive-sensing touch screen, capacitive-sensing touch screen infrared sensing touch screen, or the like, although the wireless device need not have touch screen capability. Additionally, the wireless device 1100 may have one or more antenna 1108 for sending and receiving electromagnetic radiation connected to one or more wireless data link and/or cellular telephone transceivers 1116 coupled to the processor 1102. The cellular telephone transceivers 1116 may be configured to communicate via a LTE network as well as a conventional CS network. The wireless device 1100 may also include physical buttons 1112a and 1112b for receiving user inputs, and a power button 1118 for turning the wireless device 1100 on and off. The wireless device 1100 may also include a position sensor 1122, such as a GPS receiver, coupled to the processor 1102. The wireless device 1100 may also include a camera 1124 coupled to the processor 1102.

Figure 12:
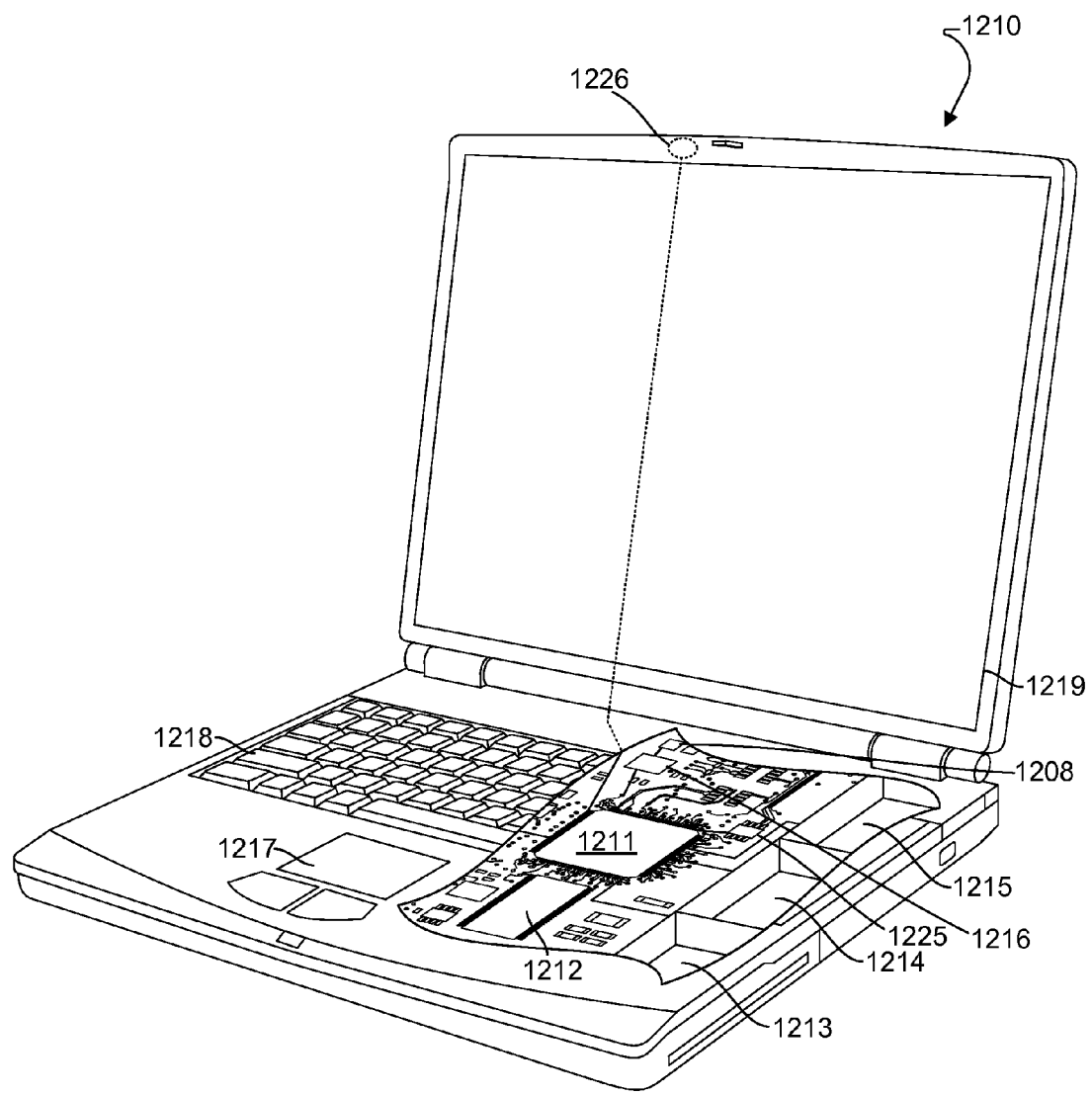
FIG. 12 is a component block diagram of a laptop computer wireless device suitable for use in an embodiment.

The various embodiments described above may also be implemented within a variety of personal computing wireless devices configured with cellular network transceivers, such as a laptop computer 1210 as illustrated in FIG. 12. Many laptop computers include a touch pad touch surface 1217 that serves as the computer's pointing wireless device, and thus may receive drag, scroll, and flick gestures similar to those implemented on mobile computing wireless devices equipped with a touch screen display and described above. A laptop computer 1210 will typically include a processor 1211 coupled to volatile memory 1212 and a large capacity nonvolatile memory, such as a disk drive 1213 of Flash memory. The laptop computer 1210 may also include a floppy disc drive 1214 and a compact disc (CD) drive 1215 coupled to the processor 1211. The laptop computer 1210 may also include a number of connector ports coupled to the processor 1211 for establishing data connections or receiving external memory wireless devices, such as a USB or FireWire® connector sockets, or other network connection circuits for coupling the processor 1211 to a network. In a notebook configuration, the computer housing includes the touchpad 1217, the keyboard 1218, and the display 1219 all coupled to the processor 1211. The laptop computer 1210 may also include a position sensor 1225, such as a GPS receiver, coupled to the processor 1211. Additionally, the laptop computer 1210 may have one or more antenna 1208 for sending and receiving electromagnetic radiation that may be connected to one or more a wireless data link and/or cellular telephone transceivers 1216 coupled to the processor 1211. The cellular telephone transceivers 1116 may be configured to communicate via a LTE network as well as a conventional CS network. The laptop computer 1210 may also include a camera 1226 coupled to the processor 1211. Other configurations of the computing wireless device may include a computer mouse or trackball coupled to the processor (e.g., via a USB input) as are well known, which may also be used in conjunction with the various embodiments.

Figure 13:
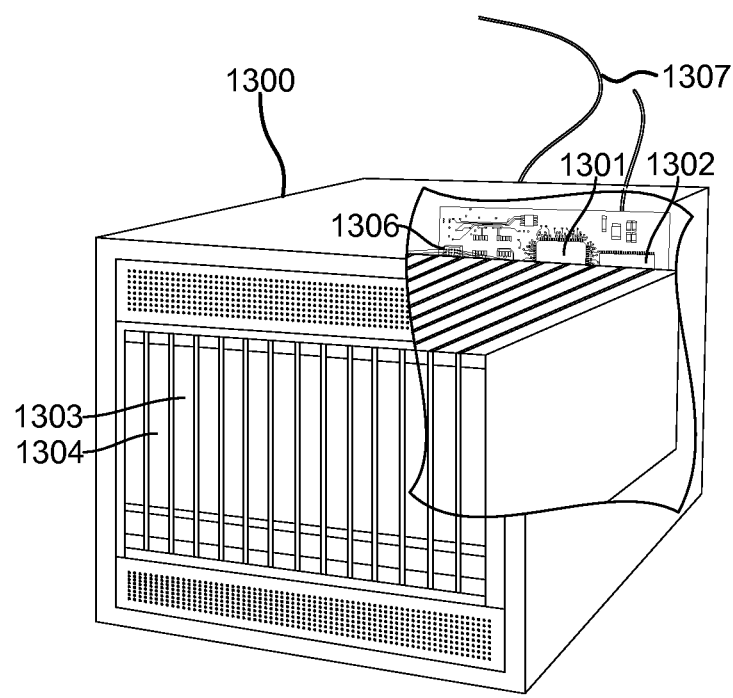
FIG. 13 is a component block diagram of a server device suitable for use in an embodiment.

The various embodiments may also be implemented on any of a variety of commercially available server wireless devices, such as the server 1300 illustrated in FIG. 13. Such a server 1300 typically includes a processor 1301 coupled to a volatile memory 1302 and a large capacity nonvolatile memory, such as a disk drive 1303. The server 1300 may also include a floppy disc drive, compact disc (CD) or DVD disc drive 1304 coupled to the processor 1301. The server 1300 may also include network access ports 1306 coupled to the processor 1301 for establishing network interface connections with a network 1307, such as a local area network coupled to other broadcast system computers and servers, the Internet, the public switched telephone network, and/or a cellular data network (e.g., CDMA, TDMA, GSM, PCS, 3G, 4G, LTE, or any other type of cellular data network).

The processors 1102, 1211, and 1301 may be any programmable microprocessor, microcomputer or multiple processor chip or chips that can be configured by software instructions (applications) to perform a variety of functions, including the functions of the various embodiments described above. In some wireless devices, multiple processors may be provided, such as one processor dedicated to wireless communication functions and one processor dedicated to running other applications. Typically, software applications may be stored in the internal memory 1104, 1110, 1212, 1213, 1302, and 1303 before they are accessed and loaded into the processors 1102, 1211, and 1301. The processors 1102, 1211, and 1301 may include internal memory sufficient to store the application software instructions. In many wireless devices the internal memory may be a volatile or nonvolatile memory, such as flash memory, or a mixture of both. For the purposes of this description, a general reference to memory refers to memory accessible by the processors 1102, 1211, and 1301 including internal memory or removable memory plugged into the wireless device and memory within the processor 1102, 1211, and 1301 themselves.

The foregoing method descriptions and the process flow diagrams are provided merely as illustrative examples and are not intended to require or imply that the operations of the various embodiments must be performed in the order presented. As will be appreciated by one of skill in the art the order of operations in the foregoing embodiments may be performed in any order. Words such as "thereafter," "then," "next," etc. are not intended to limit the order of the operations; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic wireless device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing wireless devices, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

The functions of the various embodiments described above may be implemented in hardware, software, firmware, or any combination thereof. If implemented in software, the functions may be stored as one or more instructions or code on a non-transitory computer-readable medium. The operations of a method or algorithm disclosed herein may be embodied in processor-executable instructions, which may be stored on a non-transitory computer-readable or processor-readable storage medium. Non-transitory processor-readable and computer readable storage media may be any available media that may be accessed by a processor or computer. By way of example, and not limitation, such non-transitory processor-readable and computer-readable media may include RAM, ROM, EEPROM, CD-ROM or other optical disk storage, magnetic disk storage or other magnetic storage wireless devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of non-transitory processor-readable and computer-readable media. Additionally, the operations of a method or algorithm may reside as one or any combination or set of codes and/or instructions stored on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method of performing reception reporting operations in middleware of a wireless device for a broadcast multimedia service, comprising:
performing, by a multicast service device client (MSDC) in the wireless device, a logical operation on reception reporting opt statuses set by a user for each application registered with a service class in which the broadcast multimedia service is defined, wherein an opt status for the service is generated as a result of the logical operation;
determining, by the MSDC, whether the opt status generated for the broadcast multimedia service comprises "opt in", which indicates the user's selection to participate in reception reporting; and
uploading, by the MSDC, a resulting reception report that comprises collected defined Quality of Experience (QoE) metrics in response to determining that the opt status generated for the broadcast multimedia service comprises "opt in".

2. The method of claim 1, wherein the broadcast multimedia service comprises an evolved multimedia broadcast multicast services (eMBMS) service.

3. The method of claim 1, wherein the logical operation comprises a logical AND operation.

4. The method of claim 3, further comprising logging, by the MSDC, reception metrics for the wireless device during at least one session of the broadcast multimedia service in the reception report.

5. The method of claim 4, further comprising:
collecting, by the MSDC, reception metrics logged during the at least one session of the broadcast multimedia service; and
uploading, by the MSDC, the collected reception metrics to a broadcast multimedia services network via a reception reporting module in the middleware.

6. The method of claim 5, further comprising discarding, by the MSDC, the logged reception metrics in response to determining that not all of the applications registered for the service class in which the broadcast multimedia service is defined have set an "opt in" status for reception reporting.

7. A method of performing reception reporting operations in middleware of a wireless device for a broadcast multimedia service, comprising:
retrieving, by a multicast service device client (MSDC) in the wireless device, an opt status of each application registered for a service class of the broadcast multimedia service, wherein the opt status comprises a selection by a user to either "opt in" or "opt out" of reception reporting;
determining, by the MSDC, whether all of the applications registered for the service class of the broadcast multimedia service have set an "opt in" status indicating the user's selection to participate in reception reporting; and
generating, by the MSDC, a service opt status of "opt in" in response to determining that all of the applications registered for the service class of the broadcast multimedia service have set an "opt in" status.

8. The method of claim 7, wherein the broadcast multimedia service comprises an evolved multimedia broadcast multicast services (eMBMS) service.

9. The method of claim 8, further comprising:
detecting, by the MSDC, whether an application has activated or deactivated the eMBMS service;
recording, by the MSDC, an activation/deactivation event upon detecting that the application has activated or deactivated the eMBMS service, wherein the activation/deactivation event comprises a present opt status of the application, a timestamp, and an indicator of either service activation or service deactivation; and
storing, by the MSDC, activation/deactivation events on the wireless device,
wherein determining whether all of the applications registered for the service class of the eMBMS service have set an "opt in" status indicating the user's selection to participate in reception reporting is based at least in part on stored activation/deactivation events for all of the applications.

10. The method of claim 8, further comprising generating, by the MSDC, a service opt status of "opt out" in response to determining that one or more of the applications registered for the service class of the eMBMS service have not set an "opt in" status.

11. The method of claim 10, further comprising establishing, but not logging metrics for, by the MSDC, at least one eMBMS service session in response to generating a service opt status of "opt out".

12. The method of claim 10, further comprising:
detecting, by the MSDC, when the eMBMS service has ended;
collecting, by the MSDC, a reception report for the eMBMS service when the eMBMS service has ended, wherein the reception report comprises logged reception metrics for at least one eMBMS session; and
uploading, by the MSDC, the reception report to an eMBMS network operator in response to determining that all of the applications registered for the service class of the eMBMS service have set an "opt in" status for reception reporting.

13. The method of claim 8, wherein the eMBMS service comprises an eMBMS streaming service.

14. The method of claim 8, wherein the eMBMS service comprises a file download service.

15. The method of claim 8, wherein the eMBMS service has a streaming component and a file download component.

16. The method of claim 8, further comprising establishing, and logging reception metrics for, by the MSDC, at least one eMBMS service session in response to generating a service opt status of "opt in".

17. A wireless device, comprising:
a memory;
a user interface;
a modem;
a multicast service device client (MSDC); and
a processor coupled to the memory, the user interface, the MSDC, and the modem, wherein the processor is configured with processor-executable instructions to perform middleware operations comprising:

performing, by the MSDC, a logical operation on reception reporting opt statuses set by a user for each application registered with a service class in which a broadcast multimedia service is defined, wherein an opt status for the service is generated as a result of the logical operation;

determining, by the MSDC, whether the opt status generated for the broadcast multimedia service comprises "opt in", which indicates the user's selection to participate in reception reporting; and uploading, by the MSDC, a resulting reception report that comprises collected defined Quality of Experience (QoE) metrics in response to determining that the opt status generated for the broadcast multimedia service comprises "opt in".

18. The wireless device of claim 17, wherein the broadcast multimedia service comprises an evolved multimedia broadcast multicast services (eMBMS) service.

19. The wireless device of claim 17, wherein the processor is configured with processor-executable instructions to perform middleware operations such that the logical operation comprises a logical AND operation.

20. The wireless device of claim 19, wherein the processor is configured with processor-executable instructions to perform middleware operations further comprising logging, by the MSDC, reception metrics for the wireless device during at least one session of the broadcast multimedia service.

21. The wireless device of claim 20, wherein the processor is configured with processor-executable instructions to perform middleware operations further comprising:

collecting, by the MSDC, reception metrics logged during the at least one session of the broadcast multimedia service; and uploading, by the MSDC, the collected reception metrics to a broadcast multimedia services network via a reception reporting module in middleware of the wireless device.

22. The wireless device of claim 21, wherein the processor is configured with processor-executable instructions to perform middleware operations further comprising:

discarding, by the MSDC, the logged reception metrics in response to determining that not all of the applications registered for the service class in which the broadcast multimedia service is defined have set an "opt in" status indicating the user's selection to participate in reception reporting.

23. A wireless device, comprising:
a memory;
a user interface;
a modem;
a multicast service device client (MSDC); and
a processor coupled to the memory, the user interface, the MSDC, and the modem, wherein the processor is configured with processor-executable instructions to perform middleware operations comprising:

retrieving, by the MSDC, an opt status of each application registered for a service class of a broadcast multimedia service, wherein the opt status comprises a selection by a user to either "opt in" or "opt out" of reception reporting;

determining, by the MSDC, whether all of the applications registered for the service class of the broadcast multimedia service have set an "opt in" status indicating the user's selection to participate in reception reporting; and generating, by the MSDC, a service opt status of "opt in" in response to determining that all of the applications registered for the service class of the broadcast multimedia service have set an "opt in" status.

24. The wireless device of claim 23, wherein the broadcast multimedia service comprises an evolved multimedia broadcast multicast services (eMBMS) service.

25. The wireless device of claim 24, wherein the processor is configured with processor-executable instructions to perform middleware operations further comprising:

detecting, by the MSDC, when an application has activated or deactivated the eMBMS service;

recording, by the MSDC, an activation/deactivation event upon detecting that the application has activated or deactivated the eMBMS service, wherein the activation/deactivation event comprises a present opt status of the application, a timestamp, and an indicator of either service activation or service deactivation; and storing, by the MSDC, activation/deactivation events, wherein determining whether all of the applications registered for the service class of the eMBMS service have set an "opt in" status indicating the user's selection to participate in reception reporting is based at least in part on stored activation/deactivation events for all of the applications.

26. The wireless device of claim 24, wherein the processor is configured with processor-executable instructions to perform middleware operations further comprising:

generating, by the MSDC, a service opt status of "opt out" in response to determining that one or more of the applications registered for the service class of the eMBMS service have not set an "opt in" status.

27. The wireless device of claim 26, wherein the processor is configured with processor-executable instructions to perform middleware operations further comprising:

establishing, but not logging metrics for, by the MSDC, at least one eMBMS service session in response to generating a service opt status of "opt out".

28. The wireless device of claim 26, wherein the processor is configured with processor-executable instructions to perform middleware operations further comprising:

detecting, by the MSDC, when the eMBMS service has ended;

collecting, by the MSDC, a reception report for the eMBMS service when the eMBMS service has ended, wherein the reception report comprises logged reception metrics for at least one eMBMS session; and uploading, by the MSDC, the reception report to an eMBMS network operator in response to determining that all of the applications registered for the service class of the eMBMS service have set an "opt in" status indicating the user's selection to participate in reception reporting.

29. The wireless device of claim 24, wherein the eMBMS service comprises an eMBMS streaming service.

30. The wireless device of claim 24, wherein the eMBMS service comprises a file download service.

31. wireless device of claim 24, wherein the eMBMS service has a streaming component and a file download component.

32. The wireless device of claim 24, wherein the processor is configured with processor-executable instructions to perform middleware operations further comprising:

establishing, and logging reception metrics for, by the MSDC, at least one eMBMS service session in response to generating a service opt status of "opt in".

33. A wireless device, comprising:
means for performing, by a multicast service device client (MSDC) in the wireless device, a logical operation on reception reporting opt statuses set by a user for each application registered with a service class in which a broadcast multimedia service is defined, wherein an opt status for the service is generated as a result of the logical operation;
means for determining, by the MSDC, whether the opt status generated for the broadcast multimedia service comprises "opt in", which indicates the user's selection to participate in reception reporting; and
means for uploading, by the MSDC, a resulting reception report that comprises collected defined Quality of Experience (QoE) metrics in response to determining that the opt status generated for the broadcast multimedia service comprises "opt in".

34. The wireless device of claim 33, wherein the broadcast multimedia service comprises an evolved multimedia broadcast multicast services (eMBMS) service.

35. The wireless device of claim 33, wherein means for performing, by the MSDC, the logical operation comprises means for performing, by the MSDC, a logical AND operation.

36. The wireless device of claim 35, further comprising means for logging, by the MSDC, reception metrics for the wireless device during at least one session of the broadcast multimedia service.

37. The wireless device of claim 36, further comprising:
means for collecting, by the MSDC, reception metrics logged during the at least one session of the broadcast multimedia service; and
means for uploading, by the MSDC, the collected reception metrics to a broadcast multimedia services network via a reception reporting module in middleware of the wireless device.

38. The wireless device of claim 37, further comprising means for discarding, by the MSDC, the logged reception metrics in response to determining that not all of the applications registered for the service class in which the broadcast multimedia service is defined have set an "opt in" status indicating the user's selection to participate in reception reporting.

39. A wireless device, comprising:
means for retrieving, by a multicast service device client (MSDC) in the wireless device, an opt status of each application registered for a service class of a broadcast multimedia service, wherein the opt status comprises a selection by a user to either "opt in" or "opt out" of reception reporting;
means for determining, by the MSDC, whether all of the applications registered for the service class of the broadcast multimedia service have set an "opt in" status indicating the user's selection to participate in reception reporting; and
means for generating, by the MSDC, a service opt status of "opt in" in response to determining that all of the applications registered for the service class of the broadcast multimedia service have set an "opt in" status.

40. The wireless device of claim 39, wherein the broadcast multimedia service comprises an evolved multimedia broadcast multicast services (eMBMS) service.

41. The wireless device of claim 40, further comprising:
means for detecting, by the MSDC, when an application has activated or deactivated the eMBMS service;
means for recording, by the MSDC, an activation/deactivation event upon detecting that the application has activated or deactivated the eMBMS service, wherein the activation/deactivation event comprises a present opt status of the application, a timestamp, and an indicator of either service activation or service deactivation; and
means for storing, by the MSDC, activation/deactivation events, wherein means for determining whether all of the applications registered for the service class of the eMBMS service have set an "opt in" status indicating the user's selection to participate in reception reporting includes means for using stored activation/deactivation events for all of the applications.

42. The wireless device of claim 40, further comprising means for generating, by the MSDC, a service opt status of "opt out" in response to determining that one or more of the applications registered for the service class of the eMBMS service have not set an "opt in" status.

43. The wireless device of claim 42, further comprising means for establishing but not logging metrics for, by the MSDC, at least one eMBMS service session in response to generating a service opt status of "opt out".

44. The wireless device of claim 42, further comprising:
means for detecting, by the MSDC, when the eMBMS service has ended;
means for collecting, by the MSDC, a reception report for the eMBMS service when the eMBMS service has ended, wherein the reception report comprises logged reception metrics for at least one eMBMS session; and
means for uploading, by the MSDC, the reception report to an eMBMS network operator in response to determining that all of the applications registered for the service class of the eMBMS service have set an "opt in" status indicating the user's selection to participate in reception reporting.

45. The wireless device of claim 40, wherein the eMBMS service comprises an eMBMS streaming service.

46. The wireless device of claim 40, wherein the eMBMS service comprises a file download service.

47. The wireless device of claim 40, wherein the eMBMS service has a streaming component and a file download component.

48. The wireless device of claim 40, further comprising means for establishing and logging reception metrics for, by the MSDC, at least one eMBMS service session in response to generating a service opt status of "opt in".

49. A non-transitory processor-readable storage medium having stored thereon processor-executable instructions configured to cause a processor of a wireless device to perform middleware operations comprising:
performing, by a multicast service device client (MSDC) in the wireless device, a logical operation on reception reporting opt statuses set by a user for each application registered with a service class in which a broadcast multimedia service is defined, wherein an opt status for the service is generated as a result of the logical operation;
determining, by the MSDC, whether the opt status generated for the broadcast multimedia service comprises "opt in", which indicates the user's selection to participate in reception reporting; and
uploading, by the MSDC, a resulting reception report that comprises collected defined Quality of Experience (QoE) metrics in response to determining that the opt status generated for the broadcast multimedia service comprises "opt in".

50. The non-transitory processor-readable storage medium of claim 49, wherein the broadcast multimedia service comprises an evolved multimedia broadcast multicast services (eMBMS) service.

51. The non-transitory processor-readable storage medium of claim 49, wherein the stored processor-executable instructions are configured to cause the processor of the wireless device to perform middleware operations such that the logical operation comprises a logical AND operation.

52. The non-transitory processor-readable storage medium of claim 51, wherein the stored processor-executable instructions are configured to cause the processor of the wireless device to perform middleware operations further comprising:
  logging, by the MSDC, reception metrics for the wireless device during at least one session of the broadcast multimedia service.

53. The non-transitory processor-readable storage medium of claim 52, wherein the stored processor-executable instructions are configured to cause the processor of the wireless device to perform middleware operations further comprising:
  collecting, by the MSDC, reception metrics logged during the at least one session of the broadcast multimedia service; and
  uploading, by the MSDC, the collected reception metrics to a broadcast multimedia services network via a reception reporting module in middleware.

54. The non-transitory processor-readable storage medium of claim 53, wherein the stored processor-executable instructions are configured to cause the processor of the wireless device to perform middleware operations further comprising:
  discarding, by the MSDC, the logged reception metrics in response to determining that not all of the applications registered for the service class in which the broadcast multimedia service is defined have set an "opt in" status indicating the user's selection to participate in reception reporting.

55. A non-transitory processor-readable storage medium having stored thereon processor-executable instructions configured to cause a processor of a wireless device to perform middleware operations comprising:
  retrieving, by a multicast service device client (MSDC) in the wireless device, an opt status of each application registered for a service class of a broadcast multimedia service, wherein the opt status comprises a selection by a user to either "opt in" or "opt out" of reception reporting;
  determining, by the MSDC, whether all of the applications registered for the service class of the broadcast multimedia service have set an "opt in" status indicating the user's selection to participate in reception reporting; and
  generating, by the MSDC, a service opt status of "opt in" in response to determining that all of the applications registered for the service class of the broadcast multimedia service have set an "opt in" status.

56. The non-transitory processor-readable storage medium of claim 55, wherein the broadcast multimedia service comprises an evolved multimedia broadcast multicast services (eMBMS) service.

57. The non-transitory processor-readable storage medium of claim 56, wherein the stored processor-executable instructions are configured to cause the processor of the wireless device to perform middleware operations further comprising:
  detecting, by the MSDC, when an application has activated or deactivated the eMBMS service;
  recording, by the MSDC, an activation/deactivation event upon detecting that the application has activated or deactivated the eMBMS service, wherein the activation/deactivation event comprises a present opt status of the application, a timestamp, and an indicator of either service activation or service deactivation; and
  storing, by the MSDC, activation/deactivation events are stored on the wireless device, wherein determining whether all of the applications registered for the service class of the eMBMS service have set an "opt in" status indicating the user's selection to participate in reception reporting is based at least in part on stored activation/deactivation events for all of the applications.

58. The non-transitory processor-readable storage medium of claim 56, wherein the stored processor-executable instructions are configured to cause the processor of the wireless device to perform middleware operations further comprising:
  generating, by the MSDC, a service opt status of "opt out" in response to determining that one or more of the applications registered for the service class of the eMBMS service have not set an "opt in" status.

59. The non-transitory processor-readable storage medium of claim 58, wherein the stored processor-executable instructions are configured to cause the processor of the wireless device to perform middleware operations further comprising:
  establishing but not logging metrics for, by the MSDC, at least one eMBMS service session in response to generating a service opt status of "opt out".

60. The non-transitory processor-readable storage medium of claim 58, wherein the stored processor-executable instructions are configured to cause the processor of the wireless device to perform middleware operations further comprising:
  detecting, by the MSDC, when the eMBMS service has ended;
  collecting, by the MSDC, a reception report for the eMBMS service when the eMBMS service has ended, wherein the reception report comprises logged reception metrics for at least one eMBMS session; and
  uploading, by the MSDC, the reception report to an eMBMS network operator in response to determining that all of the applications registered for the service class of the eMBMS service have set an "opt in" status indicating the user's selection to participate in reception reporting.

61. The non-transitory processor-readable storage medium of claim 56, wherein the eMBMS service comprises an eMBMS streaming service.

62. The non-transitory processor-readable storage medium of claim 56, wherein the eMBMS service comprises a file download service.

63. The non-transitory processor-readable storage medium of claim 56, wherein the eMBMS service has a streaming component and a file download component.

64. The non-transitory processor-readable storage medium of claim 56, wherein the stored processor-executable instructions are configured to cause the processor of the wireless device to perform middleware operations further comprising:
  establishing, and logging reception metrics for, by the MSDC, at least one eMBMS service session in response to generating a service opt status of "opt in".

* * * * *